Dec. 4, 1923.
L. SCHLESINGER
LAVATORY
Filed Oct. 25, 1920
1,476,471
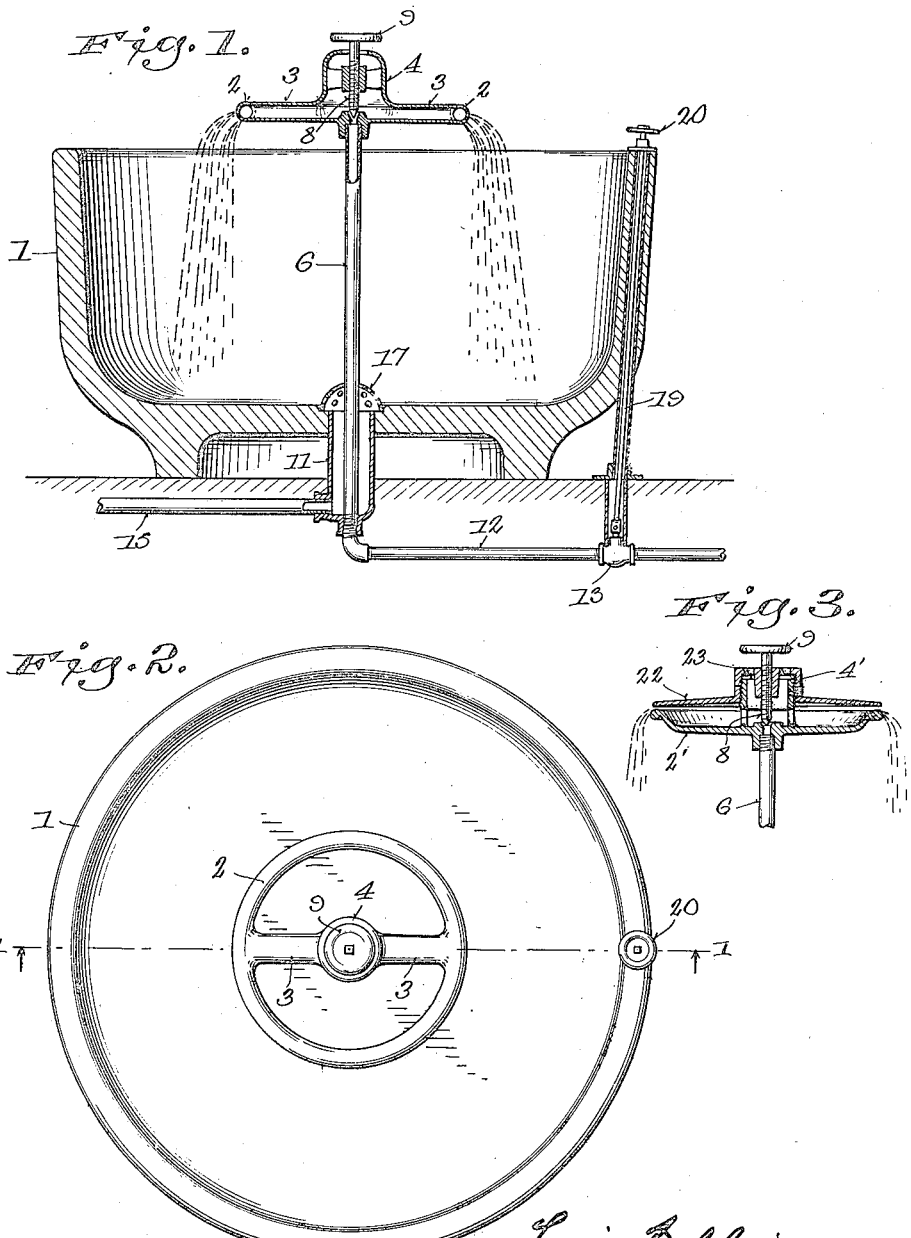

Patented Dec. 4, 1923.

1,476,471

UNITED STATES PATENT OFFICE.

LOUIS SCHLESINGER, OF MILWAUKEE, WISCONSIN, ASSIGNOR TO BRADLEY WASH-FOUNTAIN CO., OF MILWAUKEE, WISCONSIN, A CORPORATION OF WISCONSIN.

LAVATORY.

Application filed October 25, 1920. Serial No. 419,164.

*To all whom it may concern:*

Be it known that I, LOUIS SCHLESINGER, a citizen of the United States, residing at Milwaukee, in the county of Milwaukee and State of Wisconsin, have invented certain new and useful Improvements in Lavatories, of which the following is a specification, reference being had to the accompanying drawing, forming a part thereof.

This invention relates more particularly to lavatories adapted for use in factories, schools and public or other buildings by one or more persons, and to afford each user an ample supply of clean running water.

The main objects of the invention are to prevent the use of the same water by more than one person and thus avoid the communication of infectious germs from one to another and the spread of disease; to avoid splashing and waste of water and uncleanly and insanitary conditions; to promote the convenience and comfort of users; and generally to simplify and improve the construction and operation of lavatories of this class.

It consists in the construction, arrangement and combination of parts as hereinafter particularly described and pointed out in the claims.

In the accompanying drawing like characters designate the same parts in the different figures.

Figure 1 is a vertical section on the line 1—1, Fig. 2, of a lavatory embodying the invention; Fig. 2 is a plan view of the same; and Fig. 3 is a section similar to that of Fig. 1, showing a modification of the fountain forming a part of the lavatory.

Referring to Figs. 1 and 2, 1 designates a basin or receptacle which may be made of any suitable material and of any desired shape and size. It is preferably made as shown, of substantially circular form with a reentrant base adapted to closely fit and rest upon the floor so as to receive the feet of users and permit them to stand close to and lean over the rim of the receptacle, which preferably extends upwardly far enough to afford a support or rest for the users of the lavatory. Setting the base of the receptacle 1, directly on the floor, avoids insanitary conditions which might result from supporting it on legs and leaving a space between it and the floor, and lowers the bottom of the receptacle out of convenient reach of users.

The lavatory is provided with a fountain for supplying fresh running water to users in a plurality of outwardly and downwardly directed and closely associated streams, which fall inertly into the receptacle without splashing or waste, and enable a number of persons to wash at the same time without interference with one another.

The fountain may be constructed in various ways. As shown in Figs. 1 and 2, it consists of a hollow ring or substantially circular pipe 2, formed with one or more series of small or fine discharge openings arranged close together and adapted to direct a plurality of closely associated fine streams of water inertly outward and downward into the receptacle 1, through a clear space accessible to a number of users between the fountain and the wall of the receptacle as indicated in Fig. 1. The ring or pipe 2 is connected by hollow arms 3, with a central supply and compensation chamber 4, preferably extended upwardly therefrom and open at the top to the atmosphere.

A water supply pipe 6, preferably passing upwardly through an opening in the bottom of the receptacle 1, is connected at the upper end with and supports the fountain centrally over the receptacle. The supply of water from the pipe 6 which opens into the chamber 4, is regulated or adjusted by a valve 8, having a stem threaded in a nut within said chamber and provided at its upper end with a handle 9 or means for adjusting the valve.

By means of the chamber 4 opening to the atmosphere and the valve 8, the water supply to the fountain is adjusted and regulated so that the annular pipe 2 will be kept full without overflowing at the top of the chamber 4, and there will be a uniform flow from the discharge openings all around the fountain, and the streams issuing therefrom will not be subjected to pressure which will cause them to splash when they strike the hands of users and the bottom of the receptacle, the open chamber 4 compensating for variations of pressure in the water supply from the pipe 6, and allowing variation of the level of the water in the fountain without subjecting it to pressure which would cause splashing.

Water falling from the fountain into the receptacle 1, is drained therefrom through a waste outlet in the bottom of the receptacle and is not allowed to accumulate with dirt therein.

The waste outlet may consist, as shown in Fig. 1, of a tubular fitting 11, inserted at its upper end and sealed in the opening through which the water pipe 6 passes, thereby obviating the necessity of making more than one opening in the receptacle for the water supply and waste.

The upright portion of the water supply pipe may extend, as shown, axially through the fitting 11, in which it is threaded at the lower end, or otherwise fastened in communication with a main supply pipe 12, connected therewith by an elbow and provided with a cut-off valve 13.

A waste pipe 15 is connected with the lower part of the fitting 11 and leads laterally therefrom.

The opening into the upper end of the fitting 11 is provided with a strainer 17, to prevent refuse or foreign matter which may get into the receptacle 1 from clogging the waste.

The shut-off valve 13 may be provided as shown in Fig. 1, with an operating rod 19, connected with the valve stem by a universal joint and provided at its upper end adjacent the rim of the receptacle 1 with a handle 20, or it may be located in any other convenient position and provided with any other convenient means for operating it.

For supplying water at the desired temperature to the lavatory, the supply pipe 12 may be provided at any convenient point therein with a mixing valve (not shown) having hot and cold water supply connections.

In place of a fountain of the construction shown in Figs. 1 and 2, the lavatory may be provided with a fountain of any suitable form and construction which will discharge the requisite supply of water into the receptacle without pressure, in a plurality of closely associated inertly falling streams. For example, as shown in Fig. 3, the fountain may consist of a shallow open basin 2', centrally mounted on the upper end of the supply pipe 6, and provided with an upwardly extending central compensation chamber 4', and with a cover 22 extending over the rim of the basin. The cover 22 may be threaded and vertically adjustable on the chamber 4' so as to vary the space between its margin and the rim of the basin 2' and thus insure an even distribution and flow of water from the fountain all around it, in case it should not be set exactly level.

The cover is locked and held in adjusted position by a flanged cap 23, threaded on the upwardly extended chamber 4' and provided with a nut for the stem of the regulating valve 8.. The chamber 4' communicates at the top with the atmosphere through an opening or openings in the cap 23, so that the water within the chamber is allowed to rise and fall according to variations of pressure in the pipe 6, without subjecting the water within the fountain to pressure which would cause it to be discharged with force through the restricted space or opening between the cover and basin.

If the basin 2' is set perfectly level, the cover 22 may be adjusted so that the water will not come in contact therewith, but will flow in a thin film or sheet over the rim of the basin. Otherwise, if the cover is adjusted to form a restricted discharge opening so as to effect an evenly distributed discharge in a thin sheet or film all around the fountain, in case the fountain is not level, the slight rise of the water level in the chamber 4' will not increase the water pressure within the fountain sufficiently to cause it to be discharged therefrom with force enough to produce splashing.

Whether the water flows from the fountain freely over the rim of the basin without coming in contact with the cover, or in a thin sheet or film through the restricted opening between the basin and cover, it will, as it issues from the fountain, be broken into a plurality of small, closely associated streams, that will fall inertly into receptacle 1 without splashing.

The fountain, whether of the design shown in Figs. 1 and 2, or of the design shown in Figure 3, has an annular discharge from which the water is directed outwardly and downwardly and falls in a shower of fine colsely associated streams through a clear space accessible to users between the fountain and wall of the basin.

Various modifications in the form, construction and arrangement of parts of the apparatus may be made, without departure from the principle and scope of the invention as defined in the following claims.

I claim:

1. In a lavatory the combination of a basin having a waste outlet from the lower part thereof, and a fountain located at a distance above the bottom and waste outlet of the basin and having an annular discharge formed to direct water therefrom outwardly and downwardly and cause it to fall in a shower of associated streams through a clear space accessible to users between the fountain and the wall of the basin.

2. In a lavatory the combination of a basin having a waste outlet from the lower part thereof, and a fountain located above the rim of the basin and having an outwardly and downwardly directed annular discharge adapted to deliver water therefrom and cause it to fall in a shower of fine associated streams through a clear space between the fountain and the wall of the basin accessible all around the basin to a number of users at the same time..

3. In a lavatory the combination of a receptacle having a waste outlet from the lower part thereof and a fountain adapted to direct water inertly downward therefrom into the receptacle through a clear space accessible to users between the fountain and the wall of the receptacle, and provided with a water supply connection and with an upwardly extending compensation chamber open to the atmosphere above the discharge from the fountain.

4. In a lavatory the combination of a receptacle having a waste outlet from the lower part thereof, and a fountain adapted to direct water inertly outward and downward therefrom into the receptacle through a clear space accessible to users between the fountain and the wall of the receptacle and provided with a water supply connection having a regulating valve and with an upwardly extending compensation chamber open to the atmosphere above the discharge from the fountain.

In witness whereof I hereto affix my signature.

LOUIS SCHLESINGER.